United States Patent
Kaczynski, Sr.

[11] Patent Number: 5,921,013
[45] Date of Patent: Jul. 13, 1999

[54] FISHING FLOAT

[76] Inventor: James R. Kaczynski, Sr., 16 Honeycomb La., North Haven, Conn. 06473

[21] Appl. No.: 08/988,194

[22] Filed: Dec. 10, 1997

[51] Int. Cl.⁶ .................................................. A01K 93/00
[52] U.S. Cl. ........................ 43/4.5; 43/44.88; 43/44.95; 43/44.92; 441/133; D22/146
[58] Field of Search .................................. 43/4.5, 44.87, 43/44.88, 44.95, 44.92, 43.1, 44.89; 441/1, 133; D22/146

[56] References Cited

U.S. PATENT DOCUMENTS

| | | |
|---|---|---|
| 86,978 | 2/1869 | Fredericks . |
| 360,418 | 4/1887 | Clark . |
| 575,674 | 1/1897 | Woodward . |
| 1,176,631 | 3/1916 | Wells . |
| 1,371,170 | 3/1921 | Johnson . |
| 1,380,312 | 5/1921 | Bellican . |
| 1,444,754 | 2/1923 | Pruden . |
| 2,143,942 | 1/1939 | Gruenhagen ............... 43/49 |
| 2,231,270 | 2/1941 | Huston ........................ 43/49 |
| 2,255,853 | 9/1941 | Makus et al. ................ 43/49 |
| 2,393,070 | 1/1946 | Saloun ........................ 43/49 |
| 2,444,791 | 7/1948 | Stahnke et al. ............. 43/49 |
| 2,516,657 | 7/1950 | Spendlove ................. 173/273 |
| 2,706,869 | 4/1955 | Shoenfeld ................. 43/44.87 |
| 2,842,886 | 7/1958 | Williams ................... 43/44.87 |
| 3,087,275 | 4/1963 | Svoboda ................... 43/44.87 |
| 3,107,451 | 10/1963 | Sitzler et al. .............. 43/44.87 |
| 3,154,878 | 11/1964 | Ekstrand ................... 43/44.88 |
| 3,514,891 | 6/1970 | Krull ......................... 43/44.87 |
| 3,800,461 | 4/1974 | Jacobi ....................... 43/44.88 |
| 3,913,256 | 10/1975 | Morris et al. .............. 43/17.5 |
| 4,426,804 | 1/1984 | Hutson ...................... 43/44.91 |
| 4,980,987 | 1/1991 | Ramsey . |
| 5,216,831 | 6/1993 | Halterman, Jr. ........... 43/44.91 |
| 5,330,378 | 7/1994 | Park ........................... 441/133 |
| 5,608,985 | 3/1997 | Kainec ........................ 43/43.1 |

Primary Examiner—Jack W. Lavinder
Attorney, Agent, or Firm—DeLio & Peterson, LLC

[57] ABSTRACT

A fishing float comprising a buoyant body made of a pair of cylindrical sections moveable from an extended position to a folded position and a coiled loop on each of the sections for receiving a fishing line, the loop permitting the body to move with respect to the line when the sections are in the extended position. A resilient band secures the sections in the folded position and restricts movement of the body with respect to the fishing line The resilient band releases when the fishing line is subjected to a predetermined tension to permit the sections to move to the extended position.

21 Claims, 5 Drawing Sheets

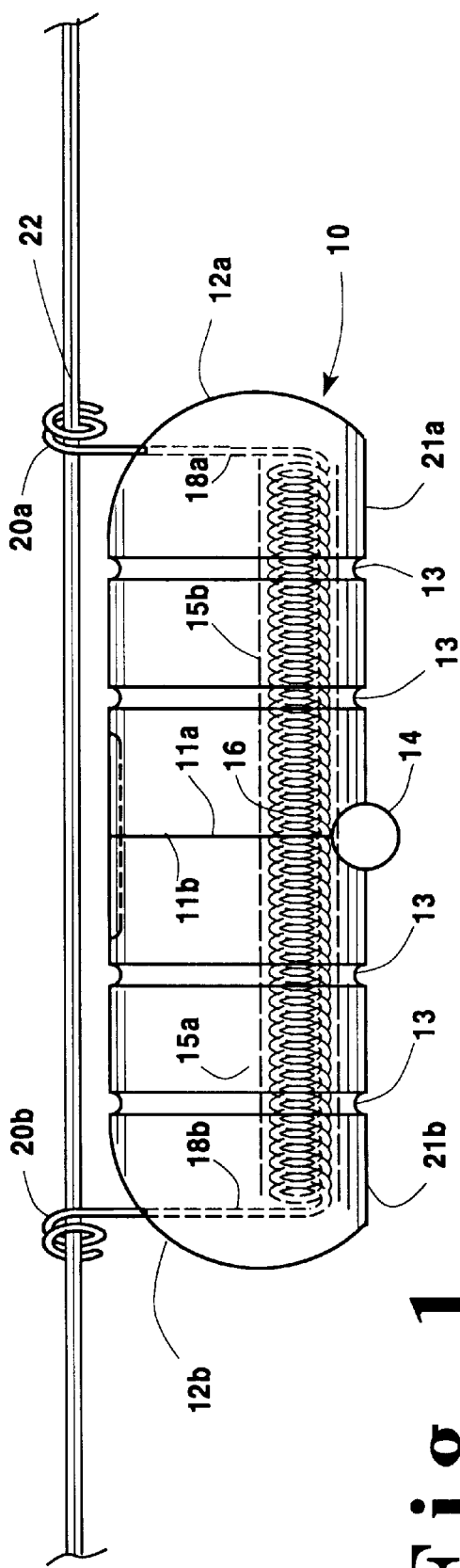
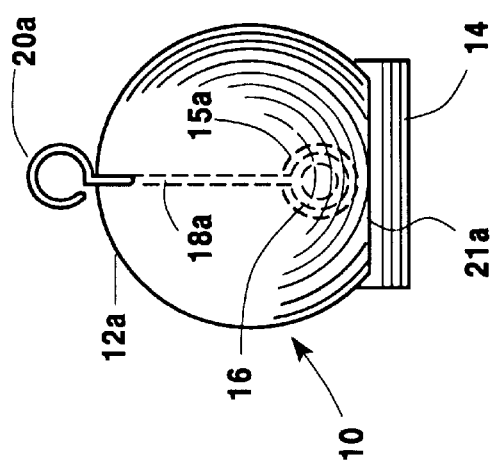

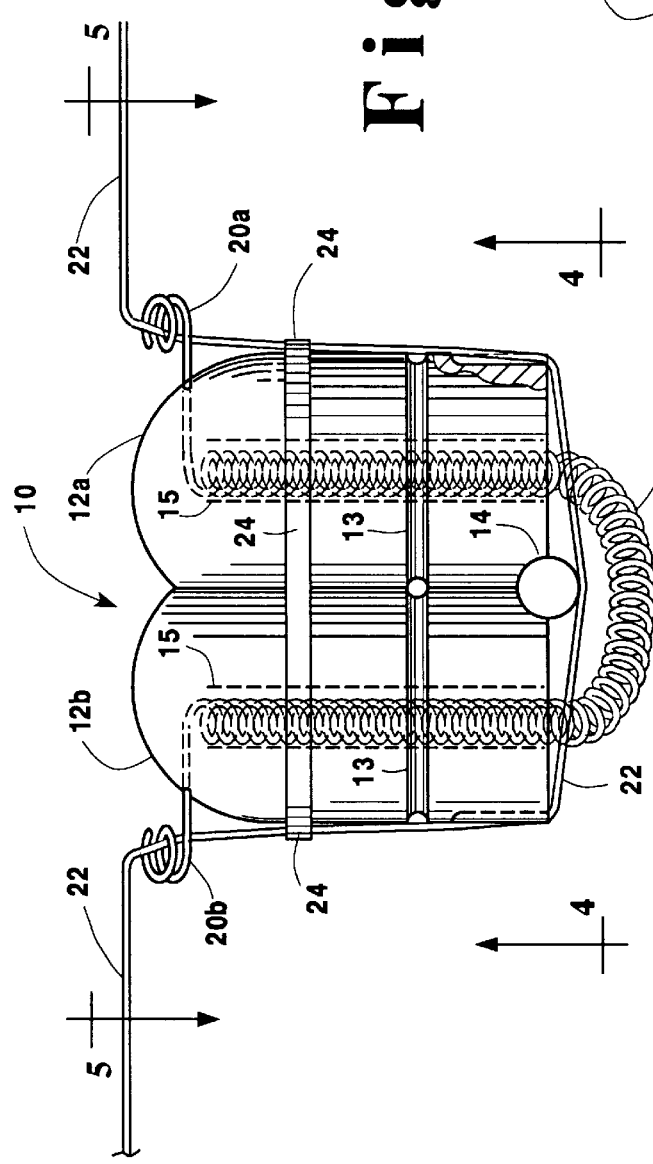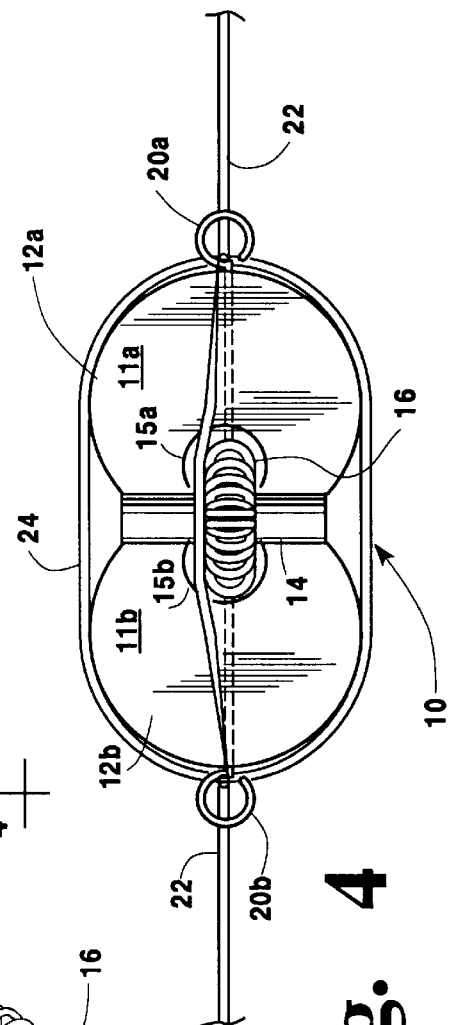

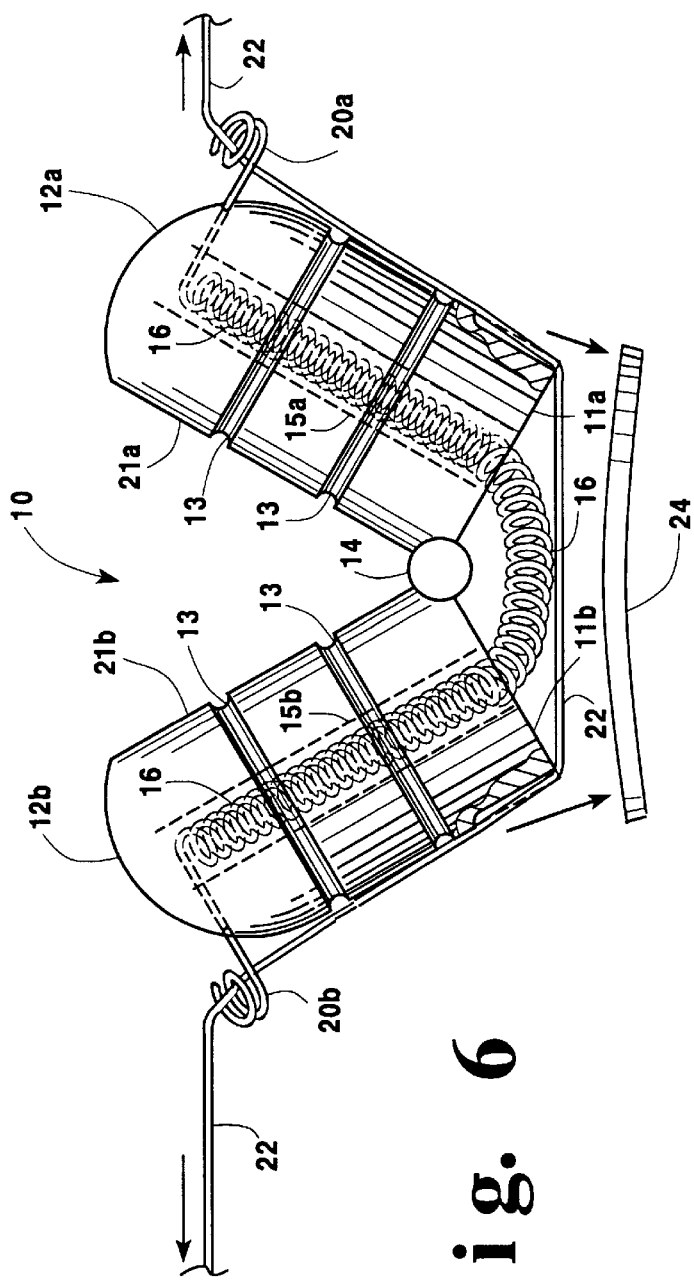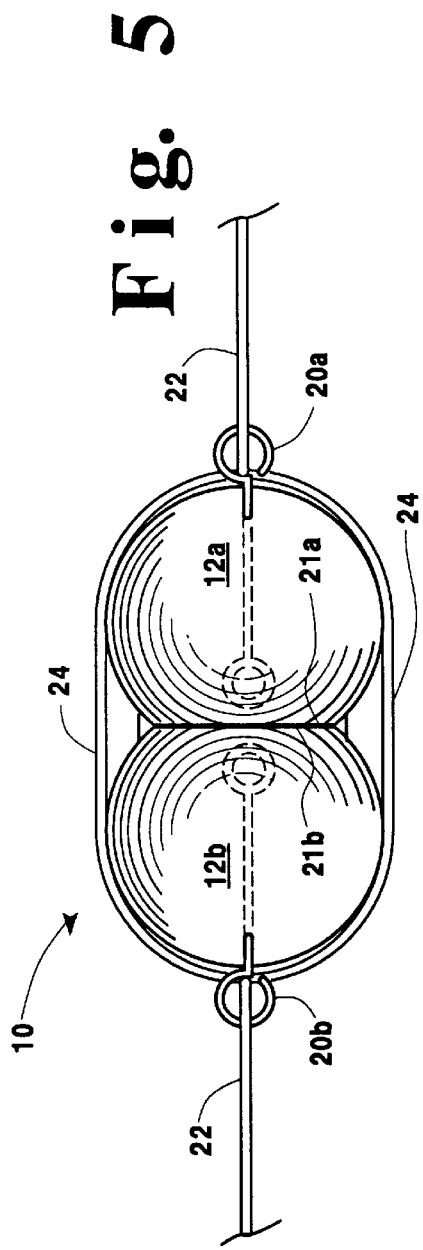

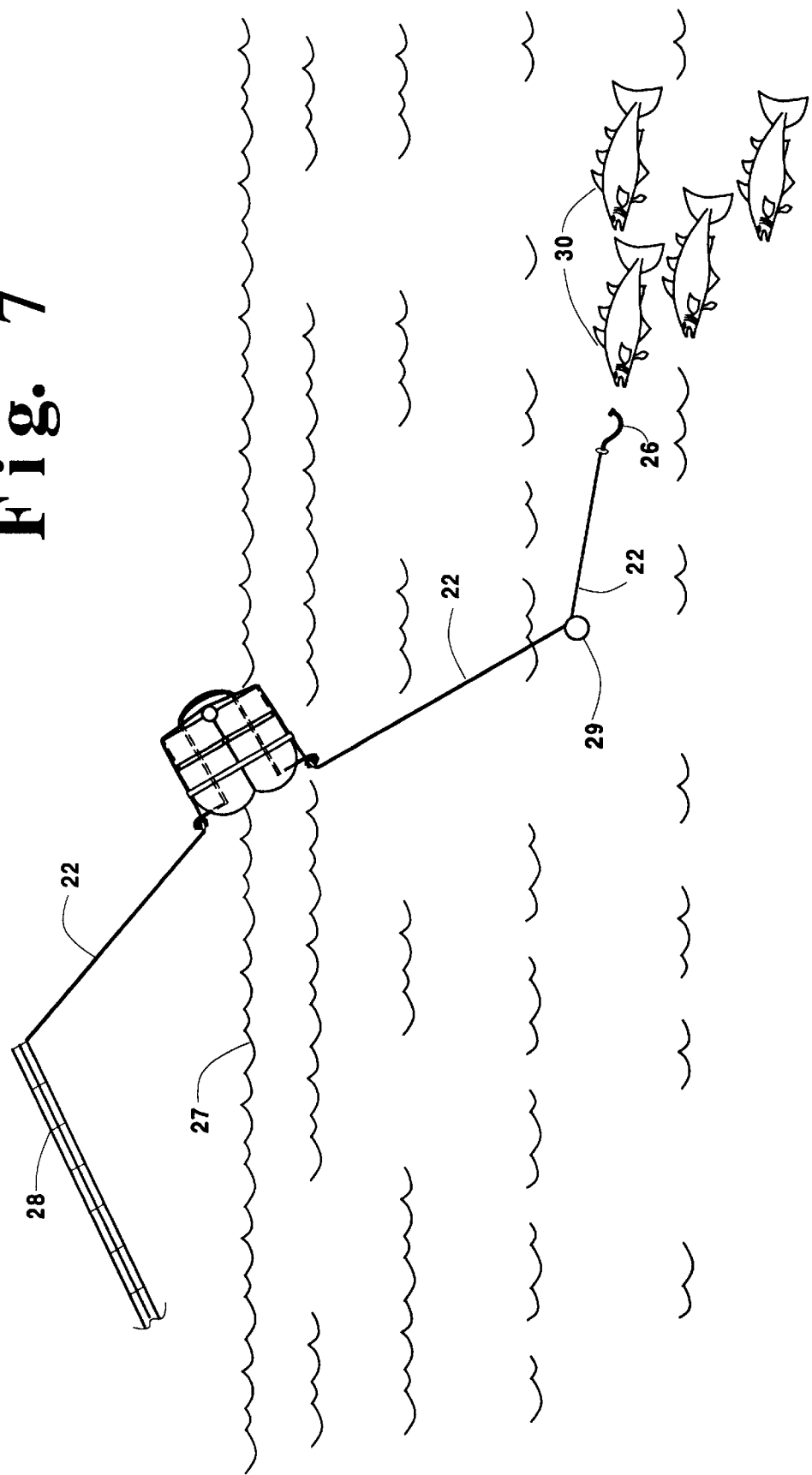

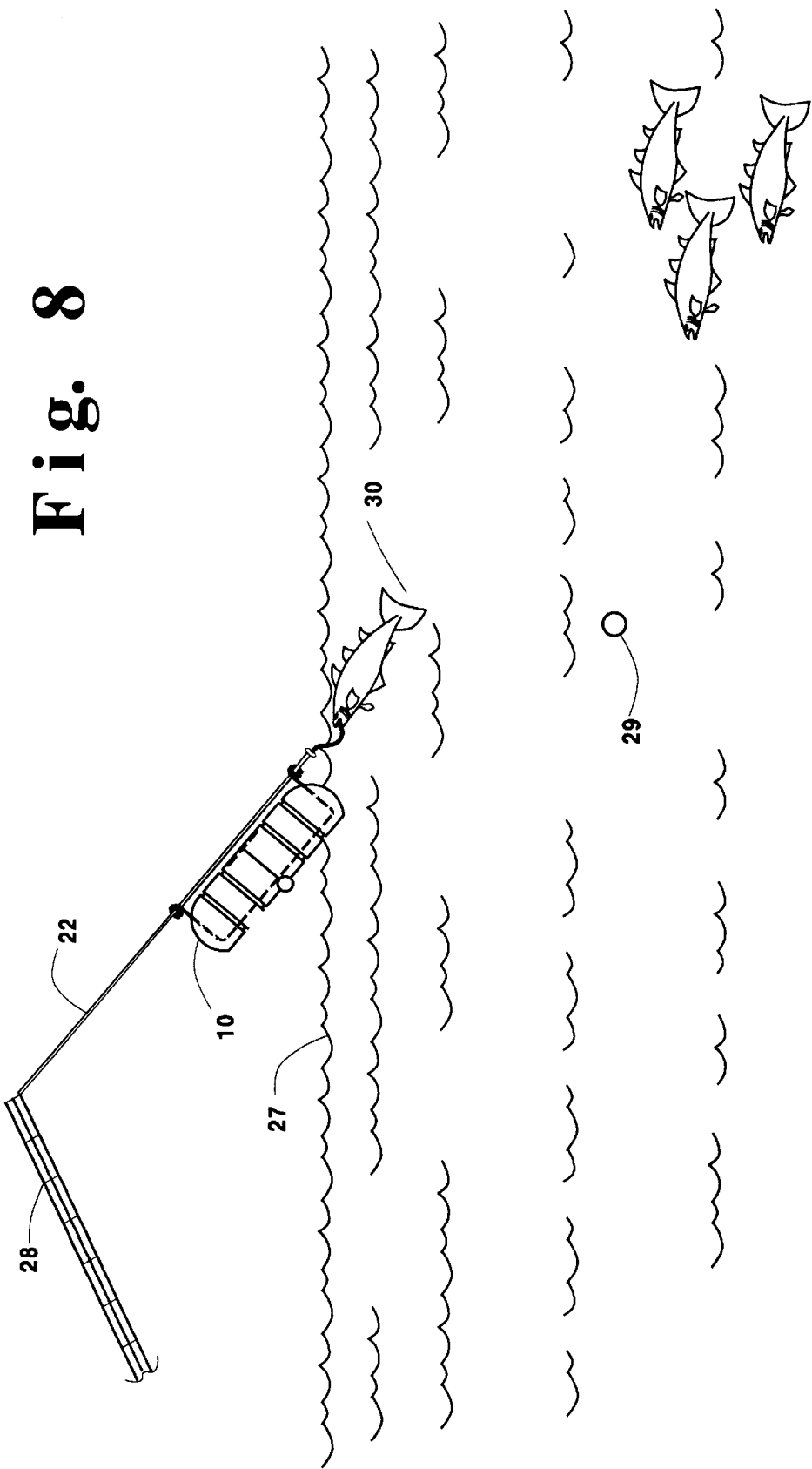

FISHING FLOAT

BACKGROUND OF THE INVENTION

1. Field of the Invention

This invention relates in general to fishing accessories and in particular to a fishing float which is translatable between fixed and slideable positions along a fishing line.

2. Description of Related Art

Fishing floats are affixed to fishing lines at a distance from the hook end of the line to permit the hook to extend a desired distance below the surface of the water to attract fish. However, when affixed to the fishing line, the fishing float becomes an impediment to reeling in the fish once it is caught. As the user reels in the line, the fishing float eventually comes in contact with the fishing pole, thereby preventing further movement of the line and limiting the practical distance the float can be positioned away from the hook. The user either has to then manually remove the fishing float from the fishing line to continue reeling in the fish, or must then manually bring in the remaining fishing line in a hand-over-hand fashion. Alternatively, user have been known to decrease the distance between the fishing float and the hook end of the fishing line in order to reduce the impediment the fishing float creates.

The prior art has not satisfactorily addressed the aforementioned problem of utilizing fishing floats. While U.S. Pat. No. 3,107,451 discloses a fishing float which is readily attachable or detachable from a fishing line, there is still the requirement that the user manually do so. Other prior art fishing floats such as those disclosed in U.S. Pat. Nos. 5,608,985, 3,514,891, 3,107,451, 3,087,275 and 2,842,886 also do not satisfactorily address this problem.

U.S. Pat. No. 2,706,869 discloses a fishing float which is releasable from a fixed to a free position, However, the device disclosed in the '869 patent has a complex internal mechanism which is subject to fouling and corrosion, and which is not easily adjustable for different releasing tensions.

Bearing in mind the problems and deficiencies of the prior art, it is therefore an object of the present invention to provide a fishing float which is of simple design and which may be automatically released from a fixed position at any desired distance from the hook and be slideable along the line when a fish is caught.

It is another object of the present invention to provide a releasable fishing float in which the releasing tension is adjustable.

A further object of the invention is to provide a releasable fishing float which utilizes easily manufactured components not subject to fouling during use.

It is yet another object of the present invention to provide an automatically releasable fishing float which is easy to operate and has a long life.

Still other objects and advantages of the invention will in part be obvious and will in part be apparent from the specification.

SUMMARY OF THE INVENTION

The above and other objects, which will be apparent to those skilled in the art, are achieved in the present invention which provides in one aspect a fishing float comprising a buoyant body foldable between a first position and a second position. The float includes means on the body for receiving a fishing line and permitting movement of the body with respect to the line when the body is in the first position and adjustable means for restricting movement of the body with respect to the line when the body is in the second position. The float also includes means for urging the body from the second position to the first position when the fishing line is subjected to a predetermined tension to permit the body to move freely along the fishing line.

Preferably, the means on the body for receiving a fishing line and permitting movement of the body with respect to the line when the body is in the first position comprises a loop for loosely receiving the fishing line, and the adjustable means for restricting movement of the body with respect to the line when the body is in the second position comprises a resilient band for tightly receiving the fishing line against a surface of the body.

The body of the fishing float may comprise a pair of sections translatable with respect to each other and the means for urging the body from the second position to the first position when the fishing line is subjected to a predetermined tension to permit the body to move freely along the fishing line may comprise a spring connecting the body sections.

The fishing float may be used in combination with a fishing pole having a fishing line with a hook secured to the line, such that the fishing float is attached to the fishing line at a position between the pole and the hook.

In another aspect, the present invention relates to a fishing float comprising a buoyant body comprising a pair of sections translatable from an extended position to a folded position and means on the body for receiving a fishing line and permitting the body to slide with respect to the line when the sections are in the extended position. The float includes means for securing the sections in the folded position and restricting movement of the body with respect to the fishing line when the sections are in the folded position. The securing means is adapted to release when the fishing line is subjected to a predetermined tension to permit the sections to translate to the extended position.

In a preferred embodiment the means on the body for receiving a fishing line and permitting the body to move with respect to the line when the sections are in the extended position comprises a loop disposed on each of the body sections and the means for securing the sections in the folded position and restricting movement of the body with respect to the fishing line when the sections are in the folded position comprises a resilient band. The fishing float may further include a spring for urging the buoyant body sections into the extended position and the sections may be movably secured to each other.

In yet another aspect, the present invention relates to a fishing float comprising a buoyant body comprising a pair of sections moveable from an extended position to a folded position and a loop disposed on the body for receiving a fishing line, the loop permitting the body to move with respect to the line when the sections are in the extended position. A resilient band is provided for securing the sections in the folded position and restricting movement of the body with respect to the fishing line when the sections are in the folded position. The band is adapted to release when the fishing line is subjected to a predetermined tension to permit the sections to move to the extended position.

Preferably, the buoyant body sections include means for urging the sections into the folded position and the means for urging the buoyant body sections into the folded position comprises a spring extending through the body sections. More preferably, the loop comprises a coil connected to the spring. The buoyant body sections may include a hinge for folding the sections against each other. The fishing float may further include recesses on the substantially cylindrical sections for receiving the resilient band when the sections are in the folded position. The sections preferably contact each other along the substantially flat ends when in the extended position and contact each other along the substantially flat sides when in the folded position.

In a further aspect, the present invention provides a method of utilizing a fishing float. There is provided a length of fishing line having a fishing hook secured thereon and a fishing float. The fishing float comprises a buoyant body foldable between a first position and a second position, such that the float body is slideable with respect to a fishing line when the float body is in the first position and substantially fixed with respect to the line when the float body is in the second position. The float body is translatable from the second position to the first position when the fishing line is subjected to a predetermined tension. The method includes affixing the fishing float to the fishing line in the second position such that the fishing line tightly contacts the float along a distance thereof to hold the fishing float fixed at a predetermined distance from the fishing hook and catching a fish on the hook. One then applying the predetermined tension to the fishing line to translate the float body to the first position and slides the fishing float along the fishing line toward the hook while reeling in the fishing line and fish.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a side elevational view of a preferred fishing float made in accordance with the present invention, the float being shown in the freely slideable position.

FIG. 2 is an end elevational view of the fishing float of FIG. 1.

FIG. 3 is a side elevational view of the fishing float of FIG. 1 in the folded fixed position on a fishing line.

FIG. 4 is an end elevational view of the fishing float of FIG. 3, along lines 4—4 of FIG. 3.

FIG. 5 is another end elevational view of the fishing float of FIG. 3 along lines 5—5 of FIG. 3.

FIG. 6 is a side elevational view of the fishing float of the present invention shown in a partially released position.

FIG. 7 is a side elevational view of the folded fixed fishing float of the present invention in use on a fishing line.

FIG. 8 is a side elevational view of the fishing float of the present invention after release traveling freely along the fishing line.

DESCRIPTION OF THE PREFERRED EMBODIMENT(S)

In describing the preferred embodiment of the present invention, reference will be made herein to FIGS. 1–8 of the drawings in which like numerals refer to like features of the invention. Features of the invention are not necessarily shown to scale in the drawings.

A first embodiment of the fishing float 10 of the present invention is depicted in FIGS. 1–8. As shown in FIGS. 1 and 2, the fishing float 10 is in a position on a fishing line 22 in which it may freely travel along the line. Fishing float 10 comprises an identical pair of buoyant body sections 12a, 12b connected by a hinge 14. Sections 12a and 12b and hinge 14 are preferably made of injection molded plastic for light weight and strength, and sections 12a, 12b are hollow for buoyancy in water. Sections 12a and 12b are substantially cylindrical except for flat side sections 21a, 21b, respectively, and have respective end faces 11a, 11b which are substantially flat and contact each other as shown when in the first, extended position.

Extending around the periphery of each of the buoyant float sections 12a, 12b are a plurality of grooves or depressions 13. These grooves are sized to retain within them resilient bands for holding the float in the folded position, as will be discussed further below.

Connecting sections 12a, 12b and urging them into the extended first position as shown is a coiled spring 16 under tension and loosely disposed within opening 15a, 15b in sections 12a, 12b, respectively. The spring 16 ends 18a, 18b extend up and outward of the opposing ends of float 10 and form coiled loops or eyes 20a, 20b, respectively, which provide means for loosely receiving a fishing line and permitting sliding movement of said body with respect to fishing line 22. Alternatively, any other form or structure may be employed for loose attachment to the fishing line. Coiled ends 20a, 20b permit the ends to be looped around a fishing line 22 without cutting the line such that the float may be quickly and easily installed. Spring sections 16, 18a, 18b, 20a and 20b are integral and preferably made of a spring grade stainless steel resistant to sea and fresh water corrosion.

The fishing float 10 is shown in the folded, fixed position in FIGS. 3, 4 and 5. Sections 12a and 12b are folded such that faces 21a, 21b are contacting each other and spring 16 is in a fully extended position under tension. To prevent spring 16 from translating the sections back into their extended position, and to fix the float in a relatively immobile position with respect to fishing line 22, there is provided a resilient band 24 made of rubber or some other resilient material. When in the folded position, grooves 13 on each section match up with those of the other section, and band 24 may fit over and into the grooves. On the opposing side sections, band 24 holds a length of fishing line 22 against the a length of the surface of float section 12a, 12b to restrict free movement of the float. The friction of line 22 folded against coils 20a, 20b and along a distance of the surface of float sections 12a, 12b also restricts movement of the fishing line with respect to the float. The size and composition of the line may restrict movement of said body with respect to the line when said body is in the second position. A plurality of resilient bands 24 may be utilized, one for each of the paired grooves 13, and other bands may be placed around the folded float sections and fishing line if additional holding power is desired. The resilient bands are themselves adjustable to positions toward and away from hinge 14 and float section ends 11a, 11b to adjust the amount of force holding the sections in their folded position. The size and resiliency of the band material 24 may also be changed to provide the desired amount of release force when said fishing line is subjected to a predetermined tension to permit the sections to move to the extended position.

As shown in FIG. 6, when a predetermined minimum force or tension is applied to line 22 in the direction of the arrows, the force exerted on the coil ends 20a, 20b tends to force the facing side surfaces 21a, 21b of the sections apart. As the sections 12a, 12b move toward an extended position, greater force is provided by spring 16 urging ends 11a, 11b together to translate the float body from the second position to the first position. The movement apart of the section faces 21a, 21b also provides downward force on band 24 so that it eventually slips out of the grooves 13, and down and off the float body, as shown in FIG. 6. The compressive action of spring 16 then forces the float body back into the full extended position as shown in FIG. 1 where it is again freely slideable on fishing line 22.

As discussed previously, the amount of force resisting the translation of the sections from the folded positions to the extending position may be adjusted by selection of the size and material of the resilient band 24, the spring tension of spring 16, and the distance of placement of the bands 24 from hinge 14.

Hinge 14 is preferred for, although not essential to, the invention since the sections 12a, 12b may be held together in both the extended and folded position with only the spring 16 securing the two sections. Hinge 14 may be a spring hinge, replacing the separate hinge and springs shown herein, to provide means for urging the float sections to the extended position.

In operation, as shown in FIG. 7, the float 10 fits on a fishing line between fishing pole 28 and a weight or sinker 29 taped onto the line at a fixed distance from the hook 26 end of line 22 to suspend the hook below the surface of the water at any desired depth. In the folded position as shown in FIG. 7, the float 10 is relatively immovable along fishing line 22. By way of example, weight 29 of about 1 to 20 ounces may be positioned about 6 to 25 feet from hook 26.

When a fish 30 is caught on hook 26 and there is tension force applied to line 22 by the pole and fish as the fish is reeled in, the float 10 snaps to the extended position (FIG. 1) and travels freely by gravity down the fishing line 22 towards the hook end and fish 30 at the end of the line. As the fish is reeled in, weight 29 is knocked off line 22 by impact of float 10 and the float then does not impede access to any of the fishing line and the fish.

As such, the present invention permit the bait and hook to be set at greater depths and at greater distances from the user and the rod without having to cut the line. The automatic release action of the float permits the catch to be brought in without being impeded by the float and the fish at the same time.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of utilizing a fishing float comprising the steps of:
   a) providing a length of fishing line having a fishing hook secured thereon;
   b) providing a fishing float comprising a buoyant body foldable between a first position and a second position, the float body being slideable with respect to a fishing line when said float body is in the first position and substantially fixed with respect to said line when said float body is in the second position, said float body being translatable from said second position to said first position when said fishing line is subjected to a predetermined tension;
   c) affixing said fishing float to said fishing line in said second position such that said fishing line tightly contacts said float along a distance thereof to hold said fishing float fixed at a predetermined distance from said fishing hook;
   d) catching a fish on said hook;
   e) applying said predetermined tension to said fishing line to translate said float body to said first position; and
   f) sliding said fishing float along said fishing line toward said hook while reeling in said fishing line and fish.

2. A fishing float comprising:
   a buoyant body foldable between a first position and a second position;
   means on said body for receiving a fishing line and permitting movement of said body with respect to said line when said body is in the first position;
   adjustable means for restricting movement of said body with respect to said line when said body is in the second position; and
   means for urging said body from said second position to said first position when said fishing line is subjected to a predetermined tension to permit said body to move freely along said fishing line.

3. The fishing float of claim 2 wherein said means on said body for receiving a fishing line and permitting movement of said body with respect to said line when said body is in the first position comprises a loop for loosely receiving said fishing line.

4. The fishing float of claim 2 wherein said adjustable means for restricting movement of said body with respect to said line when said body is in the second position comprises a resilient band for tightly receiving said fishing line against a surface of said body.

5. The fishing float of claim 2 wherein said body comprises a pair of sections translatable with respect to each other and wherein said means for urging said body from said second position to said first position when said fishing line is subjected to a predetermined tension to permit said body to move freely along said fishing line comprises a spring connecting the body sections.

6. The fishing float of claim 2 in combination with a fishing pole having a fishing line with a hook secured to said line, said fishing float being attached to said fishing line at a position between said pole and said hook.

7. A fishing float comprising:
   a buoyant body comprising a pair of sections translatable from an extended position to a folded position;
   means on said body for receiving a fishing line and permitting said body to slide with respect to said line when said sections are in the extended position; and
   means for securing said sections in said folded position and restricting movement of said body with respect to said fishing line when said sections are in the folded position, said securing means being adapted to release when said fishing line is subjected to a predetermined tension to permit said sections to translate to said extended position.

8. The fishing float of claim 7 wherein said means on said body for receiving a fishing line and permitting said body to move with respect to said line when said sections are in the extended position comprises a loop disposed on each of the body sections.

9. The fishing float of claim 7 wherein said means for securing said sections in said folded position and restricting movement of said body with respect to said fishing line when said sections are in the folded position comprises a resilient band.

10. The fishing float of claim 7 further including a spring for urging the buoyant body sections into the extended position.

11. The fishing float of claim 7 wherein said sections are movably secured to each other.

12. A fishing float comprising:

a buoyant body comprising a pair of sections moveable from an extended position to a folded position;

a loop disposed on said body for receiving a fishing line, said loop permitting said body to move with respect to said line when said sections are in the extended position; and a resilient band for securing said sections in said folded position and restricting movement of said body with respect to said fishing line when said sections are in the folded position, said band being adapted to release when said fishing line is subjected to a predetermined tension to permit said sections to move to said extended position.

13. The fishing float of claim 12 wherein the buoyant body sections include means for urging said sections into the extended position.

14. The fishing float of claim 13 wherein the means for urging said buoyant body sections into the extended position comprises a spring.

15. The fishing float of claim 14 wherein said spring extends through the body sections.

16. The fishing float of claim 15 wherein said loop comprises a coil connected to said spring.

17. The fishing float of claim 12 wherein the buoyant body sections include a hinge for folding said sections against each other.

18. The fishing float of claim 12 further including recesses on said sections for receiving said resilient band when said sections are in the folded position.

19. The fishing float of claim 12 wherein said sections are substantially cylindrical.

20. The fishing float of claim 12 wherein said sections have ends and sides, said sections contacting each other along said ends when in the extended position and contacting each other along said sides when in the folded position.

21. The fishing float of claim 12 wherein the section ends and sides are substantially flat.

\* \* \* \* \*